United States Patent [19]

Sommargren

[11] Patent Number: 5,218,424
[45] Date of Patent: Jun. 8, 1993

[54] FLYING HEIGHT AND TOPOGRAPHY MEASURING INTERFEROMETER

[75] Inventor: Gary E. Sommargren, Santa Cruz, Calif.

[73] Assignee: Zygo Corporation, Middlefield, Conn.

[21] Appl. No.: 887,430

[22] Filed: May 19, 1992

Related U.S. Application Data

[63] Continuation-in-part of Ser. No. 671,479, Mar. 19, 1991.

[51] Int. Cl.[5] .................................. G01B 9/02
[52] U.S. Cl. .................... 356/358; 356/351; 356/357
[58] Field of Search ............... 356/351, 353, 356, 358, 356/363, 357

[56] References Cited

U.S. PATENT DOCUMENTS 4,606,638  8/1986  Sommagren ............... 356/351
4,681,447  7/1987  Davidson ................. 356/358

FOREIGN PATENT DOCUMENTS 0200978  11/1986  European Pat. Off. ........... 356/351

*Primary Examiner*—Samuel A. Turner
*Attorney, Agent, or Firm*—Bryan Cave

[57] ABSTRACT

Apparatus is disclosed for the measurement of the distance between a test surface (55) and a plano reference surface (58) which are in close proximity to each other. The preferred way of accomplishing this is with a polarization phase modulated interferometer. The modulated interference pattern is photosensed with an array camera (52), and the signals are processed by a computer (80), which also controls the rotation speed of the rotating glass disk (54) which contains the plano reference surface (58), to provide not only the distance between the test surface (55) and the plano reference surface (58) but also the topography of the test surface (55) independent of the phase changes on reflection from the test surface (55). A method is also disclosed, using the instant invention, for determining the flying height (h) of a slider assembly used in magnetic storage systems. In this method, the computer (80) synchronizes the frame rate of the camera (52) such that the camera (52) integrates the intensity at each photosensitive element over one revolution of the disk (54) and collects four frames of such integrated intensity in order to determine the flying height (h). To eliminate the phase shift on reflection, a second set of data is taken with the glass disk (54) rotating at a different rotation rate.

16 Claims, 1 Drawing Sheet

FLYING HEIGHT AND TOPOGRAPHY MEASURING INTERFEROMETER

This is a continuation-in-part, of U.S. application Ser. No. 07/671,479, filed Mar. 19, 1991, entitled "Interferometer System for Measuring Very Snmall Distances".

BACKGROUND OF THE INVENTION

1. Field of the Invention

The present invention relates to an apparatus and method for interferometrically measuring not only the distance between a test surface and a plano reference surface which are in close proximity to each other, but also the topography of the test surface. More particularly, the invention relates to apparatus which rapidly and accurately measures such distance and topography and which requires no physical contact with the test surface.

2. The Prior Art

Interferometers are generally known for determining distances and the topography of a surface under test; see, for example, C. Zanoni, "Interferometry," *The Optical Industry and Systems Purchasing Directory*, Book 2, pp. E-80-E-82 (1983). Interferometry relies ultimately on the measurement of phase. In traditional interferometry, the measurement of phase is derived from the geometry of the fringe pattern.

Phase measuring interferometry ascertains the phase at each point in the interference pattern by measuring the corresponding intensity variation as the overall phase is modulated.

While the prior-art fringe pattern and phase measuring interferometers are useful for many applications, there are some important measurements for which they cannot be used such as, for example, in magnetic data storage systems where it is required to measure the flying height of a slider assembly on a rapidly rotating rigid disk in order to verify the performance of the slider assembly. The flying height as used herein is the distance between the magnetic head pole and the surface of the rotating rigid disk; see, e.g., M. F. Garnier, et al., U.S. Pat. No. 3,855,625 issued Dec. 17, 1974. The flying results from the aerodynamic effects produced by the rigid disk's rotation. The flying height ranges from near contact to several hundred nanometers depending on the design of the slider. In addition to the flying height, it is desirable to measure the topography as well as the angular orientation, i.e. pitch and roll of the air bearing surfaces (ABS) of the slider, in order to assess the compliance of these parameters to the design specifications. Moreover, it is desirable to measure these aforementioned parameters quickly and automatically with minimum operator intervention. For this application, the flying height is nominally less than one-half of a wavelength of visible light.

Prior-art apparatus and methods for measuring the flying height of a slider assembly are disclosed in B. Bhushan, *Tribology and Mechanics of Magnetic Storage Devices*, pp. 765-797 (New York: Springer-Verlag, 1990). Prior-art methods include: visual assessment of the color bands produced by white light interferometry, and multiple wavelength interferometry, coupled with a spectral radiometer, see, e.g., A. Niagam, "A Visible Laser Interferometer for Air Bearing Separation Measurement to Submicron Accuracy," Trans. ASME, Vol. 104, pp. 60-65 (Jan. 1982); C. Lin, "Techniques for the Measurement of Air-Bearing Separation—A Review," IEEE Trans. on Magnetics, Vol. MAG-9, No. 4, pp. 673-677 (Dec. 1973); T. Ohkubo and J. Kishegami, "Accurate Measurement of Gas-Lubricated Slider Bearing Separation using Visible Laser Interferometry," Trans. ASME, Vol. 110, pp. 148-155 (Jan. 1988); and D. A. Fridge, et al., U.S. Pat. No. 4,593,368 issued Jun. 3, 1986. This technique is incorporated in commercially available products such as the line of Automatic Digital Flying Height Testers produced by Pacific Precision Laboratories, Inc. (PPL) of Chatsworth, CA. Another prior art method employs capacitive-type sensors, see, for example, G. L. Best, "Comparison of Optical and Capacitive Measurements of Slider Dynamics," IEEE Trans. on Magnetics, Vol. MAG-23, No. 5, pp. 3453-3455 (Sept. 1987). The prior-art optical techniques have generally measured the flying height using a rapidly rotating glass disk, one surface of which is a reference surface of an interferometer. White light interferometry suffers from a number of limitations; first, as the flying height gets below one-half of the shortest wavelength used, i.e., approximately 0.2 micrometers, only limited and ambiguous information is available; second, it does not take into account the wavelength dependent phase change on reflection from the air bearing surface, which affects the measurement of flying height; third, it does not lend itself to automated operation for high throughput production testing. A single slider manufacturer typically produces 200,000 to 500,000 slider assemblies per month. Similarly, the multiple wavelength interferometry technique suffers from the same limitations. The capacitive sensor approach is suitable for some laboratory testing but requires that capacitive transducers be added to the slider to be tested. For production testing this is neither practical nor cost effective. Furthermore, all of the aforementioned prior-art techniques provide poor spatial data sampling.

Commonly-owned U.S. Pat. No. 4,606,638 discloses a Fizeau interferometer for the measurement of the distance between an air bearing surface or ABS and a plano reference surface which are in close proximity to each other. The plano reference surface is a front surface polarizer. The manufacture of the front surface polarizer is very costly and any surface imperfections can cause problems at low flying heights.

Thus while prior-art fringe pattern and phase measuring interferometers are useful for some applications, they cannot satisfactorily measure the distance between a surface under test and a plano reference surface which are in close proximity to each other.

SUMMARY OF THE INVENTION

In accordance with the instant invention, I provide an optical interferometer system capable of measuring the distance between a test surface and a plano reference surface which are in close proximity to each other comprising: (1) a source of a beam of coherent, single wavelength, linearly polarized energy, most preferably a laser; (2) means for spatially filtering and expanding the diameter of said beam; (3) means, most preferably a first polarization beam shearer to produce two spatially separated beams with orthogonal polarizations; (4) means, most preferably a rotating glass disk oriented at Brewster's angle to said separated beams to produce a second pair of orthogonally polarized, separated beams, one of which is reflected from a reference surface of said glass disk and the second of which is reflected from the test surface which is in close proximity to said reference surface; (5) means, most preferably, a second polarization beam shearer to recombine said second pair of spatially separated orthogonally polarized beams into a single beam with two orthogonal polarizations; (6) means, most preferably, a polarizer, for producing an interference pattern between the beams reflected from the reference and test surfaces; (7) means, most preferably a phase shifter located either before the first polarization beam shearer or after the second polarization beam shearer for varying the relative phase of the orthogonal polarization components to modulate said interference pattern; (8) means, most preferably, an optical system for imaging said test surface onto the photosensitive elements of; (9) means, most preferably a solid state array camera, for photosensing the radiant energy of said interference pattern over a two-dimensional array of points over a period of time equal to that for one rotation of said glass disk to produce electrical outputs; (10) means, most preferably a computer, for calculating a first set of phases over said two-dimensional array of points from said electrical outputs; (11) means, most preferably varying the rotation rate of said glass disk by a known amount, to obtain a second set of phases over said two-dimensional array of points; (12) means, most preferably said computer, for calculating the distance between said reference surface and said test surface over said two-dimensional array of points from said first and second set of phases such that said calculated separation is independent of phase shifts on reflection at said test surface; (13) means, most preferably said computer, for calculating the minimum distance, the location of said minimum distance, the pitch and roll, the crown, camber, and topography of said test surface, while said test surface is flying.

THE DRAWING

In the drawing,

FIG. 1 depicts in schematic form the presently preferred embodiment of the instant invention, shown from the side.

DETAILED DESCRIPTION OF THE INVENTION

Figure 1:
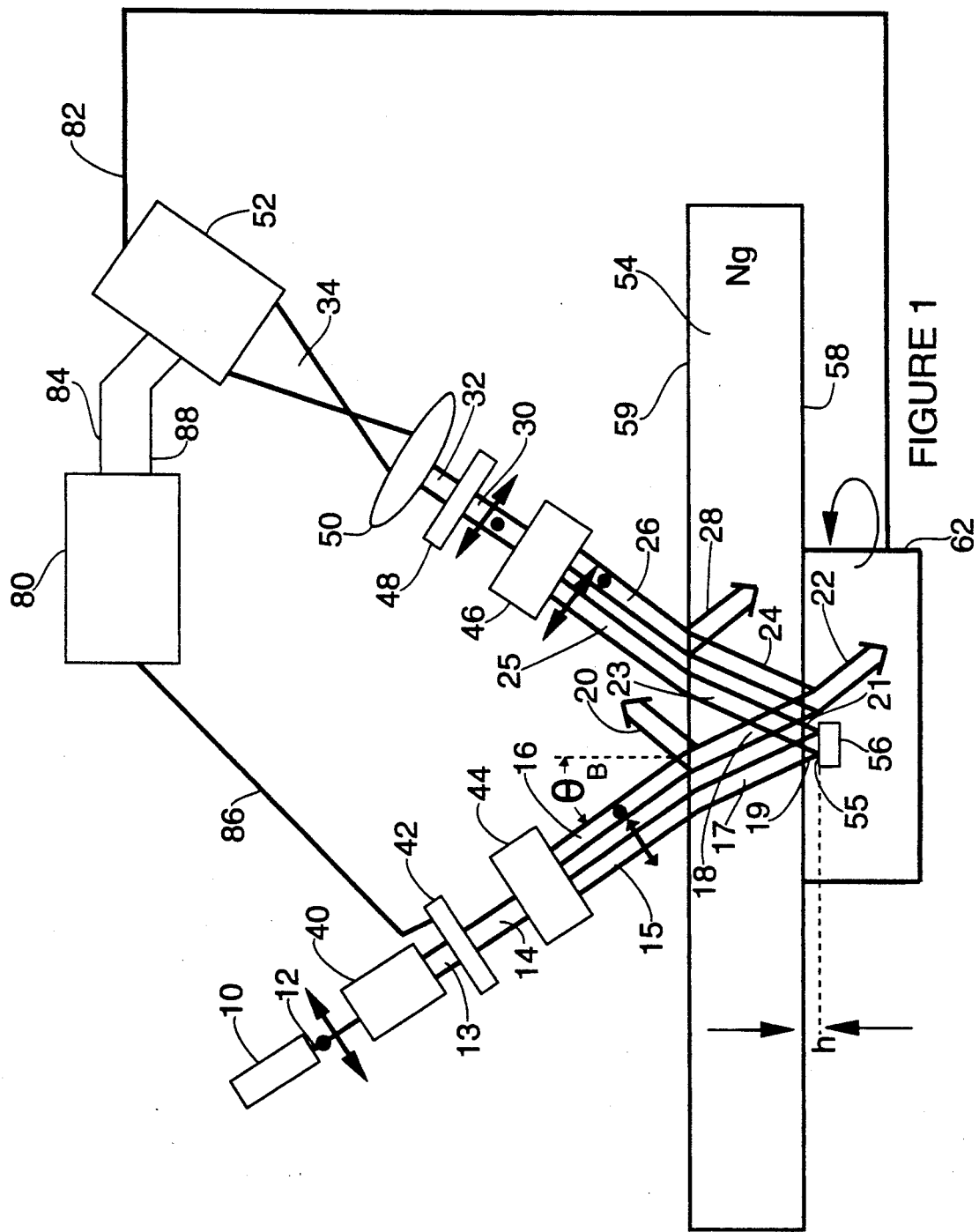

FIG. 1 depicts in schematic form the presently preferred embodiment of the present invention, although, of course, other embodiments are possible without departing from the spirit and scope of the present invention. While the apparatus of the present invention has application for a wide range of radiation sources, the following description is taken by way of example with respect to an optical measuring system employing a laser. In this regard, light source (10), which most preferably uses a laser, emits monochromatic beam (12) which has two components of orthogonal linear polarization as indicated by the dot and arrow. Beam (12) passes through spatial filter/collimator (40) which produces a larger diameter beam (13). Spatial filter/collimator (40), as is well known uses an internal lens system and a small aperture located at the focus of the first lens to eliminate spurious light and artifacts which are frequently found to accompany the principal beam (12) and to collimate the resultant beam (13). Beam (13) then passes through a phase shifter (42) which varies the relative phase of the orthogonal polarization components of beam (13) by $2\pi n/N$ (N=4, n=0,1,2,3) to produce beam (14). If desired, phase shifter (42) could instead be placed after imaging lens (50). Depending on its location, phase shifter (42) may be any of the following: a piezoelectrically driven mirror or retroreflector, a rotatable half-wave retardation plate, or an electro-optic device. Beam (14) then passes through polarization beam shearer (44) to produce two spatially separated beams (15) and (16) with orthogonal polarizations. Polarization beam shearer (44) may preferably be comprised of any of the following: a polarization beamsplitter and mirror, a polarization shear plate, or a birefringent crystal. Beams (15) and (16) are incident on the top surface (59) of a rotating glass disk (54) at Brewster's angle, $\theta_B$ which is given by, $$\theta_B = \tan^{-1} n_g$$

where $n_g$ is the index of refraction of glass disk (54). Since beam (15) is polarized in the plane of incidence, all of beam (15) passes into glass disk (54) as beam (17). Since beam (16) is polarized perpendicular to the plane of incidence, part of beam (16) passes into glass disk (54) as beam (18) while part is reflected from the top surface (59) of glass disk (54) as beam (20). Beam (20) is of no interest under the present circumstances. Beam (17) exits the bottom surface (58) of glass disk (54) as beam (19) and is incident on the air bearing surface (55) of the magnetic head (56) which is aerodynamically flying some distance, h, from the bottom surface (58) of glass disk (54) due to the disk's rotation. The distance, h, is the parameter being measured by the apparatus of the present invention. Surface (55) is the test surface. Beam (19) is preferably reflected from the air bearing surface (55) of the magnetic head (56) as beam (21) and passes into glass disk (54) as beam (23). Part of beam (18) is reflected from the bottom surface (58) of glass disk (54) as beam (24) while part is transmitted as beam (22). Beam (22) is also of no interest under the present circumstances. Part of beam (24) is transmitted through the upper surface (59) of glass disk (54) as beam (26) while part is reflected as beam (28). Beam (28) is also of no interest under the present circumstances. Beams (25) and (26) are orthogonally polarized as were beams (15) and (16). Beams (25) and (26) are recombined by polarization beam shearer (46) as beam (30) which has two orthogonally polarized components. Polarization shearers (44) and (46) are preferably of similar design. Beam (30) then passes through polarizer (48) which preferably has its polarization axis at 45 degrees to each of the polarization components. Both components of transmitted beam (32) are now of the same polarization and will optically interfere. Beam (32) then passes through lens (50) as beam (34) and is incident on photosensing device (52). Photosensing device (52) is preferably a solid state camera with photosensitive elements in a two-dimensional array. Lens (50) is chosen so as to image the surface (55) of magnetic head (56) onto the photosensitive elements of photosensing device (52). This image is of the interference pattern produced by the light wave reflected from the air bearing surface (55) of magnetic head (56) and the light wave reflected from the lower surface (58) of glass disk (54). The phase difference between these waves is related to the distance, h. The amplitudes of these waves are given, respectively by, $$V_m = A_m\, e^{-ik(z_m + 2h \cos \theta_B) - i\phi}$$

and $$V_r = A_r\, e^{-ikz_r - 2\pi in/N}$$

where $A_m$ and $A_r$ are related to the reflectivities of the magnetic head (56) and the surface (58) of glass disk (54), respectively, $k=2\pi/\lambda$ ($\lambda$ is the wavelength of beam (12)), $z_m(x,y)$ and $z_r(x,y)$ are the optical path lengths traveled by each wave through glass disk (54), and $\phi$ is the phase change on reflection from surface (55) of the magnetic head (56). The intensity of the image at photosensing device (52) is given by, $$I(x,y)=Am^2+Ar^2+2AmAr \cos [k(z_m-z_r)+2kh \cos \theta_B+\phi-2\pi n/N]$$

$$I(x,y)=Am^2+Ar^2+2AmAr \cos [kt+2kh \cos \theta_B+\phi-2\pi n/N]$$

where t is the difference in optical path through glass disk (54) due to manufacturing imperfections (flatness, parallelism, homogeneity).

Computer (80) controls the rotation speed of glass disk (54) via signal (82) sent to motor/controller (62). Motor/controller (62) is located at the center of glass disk (54) while magnetic head (56) is located at some radius from the center of glass disk (54). Computer (80) also synchronizes the frame rate of photosensing device (52) via signal (84) such that photosensing device (52) integrates the intensity at each photosensitive element over an integral number of revolutions of glass disk (54). In addition, computer (80) controls phase shifter (42) via signal (86) such that the phase between polarization components in beam (14) is shifted by $\pi/2$ after a frame of integrated intensity is sent from photosensing device (52) to computer (80) via signal (88). To determine the distance, h, four frames (N=4) of integrated intensity are collected and stored by computer (80), one for each distinct phase shift (n=0,1,2,3) of phase shifter (42). These integrated intensities are given by, $$I_0 = C_1 + C_2 \cos (2kh \cos \theta_B + \phi)$$

$$I_1 = C_1 + C_2 \sin (2kh \cos \theta_B + \phi)$$

$$I_2 = C_1 - C_2 \cos (2kh \cos \theta_B + \phi)$$

and $$I_3 = C_1 - C_2 \sin (2kh \cos \theta_B + \phi).$$

Since the intensity is integrated over an integral number of revolutions the dependence on the variable optical path, t, through glass disk (54) only influences the constant $C_2$ and not the argument of the cosine. The phase $\Phi(x,y)$ is calculated by computer (80) at each point in the image of magnetic head (56) using $$\Phi(x,y)=\tan^{-1}[(I_1-I_3)/(I_0-I_2)]$$

$$\Phi(x,y)=2kh \cos \theta_B+\phi.$$

To eliminate the phase shift on reflection, $\Phi$, a second set of data, $\Phi_0(x,y)$, is preferably taken with glass disk (54) rotating at a slow rotation rate so that air bearing surface (55) of magnetic head (56) is in contact with glass disk (54) at at least one position where h=0. This occurs where $\Phi_0(x,y)$ is a minimum. Therefore, $$\phi=\Phi_0(x,y)_{min}.$$

The flying height, h, is then calculated by computer (80) using $$h(x,y)=(\Phi(x,y)-\Phi_0(x,y)_{min})\lambda/4\pi \cos \theta_B$$

To eliminate the phase shift on reflection, $\phi$, a second set of data is preferably taken with glass disk (54) rotating at a different rotation rate, the ratio of rates being $\alpha$. Since the distance, h, is proportional to the disk rotation rate at low flying heights, the phase $\Phi_0(x,y)$ at each point in the image is similarly given by, $$\Phi_0(x,y)=2k\alpha h \cos \theta_B+\phi.$$

The distance, h, is then calculated by computer (80) using $$h(x,y)=(\Phi(x,y)-\Phi_0(x,y))\lambda/(4\pi(1-\alpha) \cos \theta_B)$$

which is independent of the phase change on reflection of the air bearing surface (55) of the magnetic head (56).

Since the distance, h, is calculated at each point on the air bearing surface (55) of the magnetic head (56), the following information can readily be obtained from h(x,y):

(a) The flying height from smallest value of h;
(b) The location of smallest distance;
(c) Pitch and roll of magnetic head (56) air bearing surface (55);
(d) Crown of air bearing surface (55) of the magnetic head (56);
(e) Shape changes of the air bearing surface (55) of the magnetic head (56) caused by flying.

The principal advantages of this method and apparatus are:

(a) There is a linear relationship between the measured phase and distance, h, due to the fact that this apparatus is a two beam interferometer. Other approaches, which are based on multiple beam interference, have a non-linear relationship between distance, h, and both the intensity and phase of the interference pattern in the image. This makes the determination of h more difficult and also less accurate.

(b) This apparatus can measure h down to zero (contact of air bearing surface (55) with the bottom surface (58) of glass disk (54)). Other approaches cannot measure h below one sixth of the average wavelength due to the insensitivity of image intensity to distance h.

(c) This apparatus operates with a monochromatic light source. Other approaches use polychromatic light sources that require measurements at a multitude of wavelengths thereby increasing the measurement time significantly.

(d) The distance, h, is measured simultaneously at all locations on air bearing surface (55) with this apparatus. Other approaches measure h sequentially, thereby increasing the measurement time significantly.

(e) The number of points measured on air bearing surface (55) is several tens of thousands with this apparatus. Other approaches measure only a few points, typically four to six, significantly reducing the information that can be derived (e.g. the magnitude and position of the smallest distance, crown).

(f) Since this apparatus uses monochromatic light, the effect of the phase change on reflection (which is an unknown quantity) from air bearing surface (55) can be eliminated by making measurements at two different rotation speeds of glass disk (54). Other approaches using polychromatic light cannot easily eliminate this effect because the phase change on reflection is a function of wavelength.

While a preferred embodiment of the invention has been disclosed, obviously modification can be made therein without departing from the spirit and scope of the invention as defined in the following claims.

What is claimed is:

1. An optical interferometer system capable of measuring the distance between a test surface and a plano reference surface which are in close proximity to each other comprising:

a source of beam of coherent, single wavelength, linearly polarized energy, said beam having a diameter and orthogonal polarization components having a relative phase;

means for spatially filtering and expanding said beam diameter;

means for producing a first pair of spatially separated beams with orthogonal polarizations from said spatially filtered beam;

rotating means comprising said plano reference surface and disposed for enabling said first pair of spatially separated beams to be incident thereon for producing a second pair of orthogonally polarized spatially separated beams, one of which is reflected from said plano reference surface of said rotating means the second of which is reflected from said test surface which is in close proximity to said plano reference surface;

means for recombining said second pair of spatially separated orthogonally polarized beams into a single beam with two orthogonal polarizations;

means for producing an interference pattern between said beams reflected from said plano reference and test surfaces, said reference pattern having radiant energy;

means for varying said relative phase of said orthogonal polarization components to modulate said interference pattern;

means disposed for imaging said test surface onto means for photosensing said radiant energy of said interference pattern over a two dimensional array of points over a period of time equal to that for at least one rotation of said rotating means for producing an electrical output; and means for calculating said distance between said plano reference surface and said test surface over said two dimensional array of points in accordance with said electrical outputs; said rotating means comprising a rotating glass disk substantially oriented at Brewster's angle to said separated beams for producing said second pair of orthogonally polarized separated beams, said calculating means comprising means for calculating a first set of phases over said two dimensional array of points said, said system further comprising means for varying the rotating rate of said glass disk by a known amount for providing a different rotation rate for said glass disk for obtaining a second set of phases over said two dimensional array of points, said calculating means calculating said distance between said reference surface and said test surface over said two dimensional array of points from said first and second set of phases such that said calculated separation is independent of phase shifts on reflection at said test surface.

2. A system in accordance with claim 1 wherein said calculating means further comprises means for calculating a minimum distance, a location of said minimum distance, a pitch and roll, crown, camber, and topography of said test surface while said test surface is flying.

3. A system in accordance with claim 2 wherein said light source comprises a laser.

4. A system in accordance with claim 1 wherein said light source comprises a laser.

5. An optical interferometer system capable of measuring the distance between a test surface and a plano reference surface which are in close proximity to each other comprising:

a source of beam of coherent, single wavelength, linearly polarized energy, said beam having a diameter and orthogonal polarization components having a relative phase;

means for spatially filtering and expanding said beam diameter;

means for producing a first pair of spatially separated beams with orthogonal polarizations from said spatially filtered beam;

rotating means comprising said plano reference surface and disposed for enabling said first pair of spatially separated beams to be incident thereon for producing a second pair of orthogonally polarized spatially separated beams, one of which is reflected from said plano reference surface of said rotating means the second of which is reflected from said test surface which is in close proximity to said plano reference surface;

means for recombining said second pair of spatially separated orthogonally polarized beams into a single beam with two orthogonal polarizations;

means for producing an interference pattern between said beams reflected from said plano reference and test surfaces, said reference pattern having radiant energy;

means for varying said relative phase of said orthogonal polarization components to modulate said interference pattern;

means disposed for imaging said test surface onto means for photosensing said radiant energy of said interference pattern over a two dimensional array of points over a period of time equal to that for at least one rotation of said rotating means for producing an electrical output; and means for calculating said distance between said plano reference surface and said test surface over said two dimensional array of points in accordance with said electrical outputs, said photosensing means comprising a solid state array camera comprising a plurality of photosensitive elements on which said test surface is imaged, said rotating means comprising a rotating glass disk substantially oriented at Brewster's angle to said separated beams for producing said second pair of orthogonally polarized separated beams, said calculating means comprising means for calculating a first set of phases over said two dimensional array of points, said system further comprising means for varying the rotating rate of said glass disk by a known amount for providing a different rotation rate for said glass disk for obtaining a second set of phases over said two dimensional array of points, said calculating means calculating said distance between said reference surface and said test surface over said two dimensional array of points from said first and second set of phases such that said calculated separation is independent of phase shifts on reflection at said test surface.

6. A system in accordance with claim 5 wherein said calculating means further comprises means for calculating a minimum distance, a location of said minimum distance, a pitch and roll, crown, camber, and topography of said test surface while said test surface is flying.

7. An optical interferometer system capable of measuring the distance between a test surface and a plano reference surface which are in close proximity to each other comprising:

a source of beam of coherent, single wavelength, linearly polarized energy, said beam having a diameter and orthogonal polarization components having a relative phase;

means for spatially filtering and expanding said beam diameter;

means for producing a first pair of spatially separated beams with orthogonal polarizations from said spatially filtered beam;

rotating means comprising said plano reference surface and disposed for enabling said first pair of spatially separated beams to be incident thereon for producing a second pair of orthogonally polarized spatially separated beams, one of which is reflected from said plano reference surface of said rotating means the second of which is reflected from said test surface which is in close proximity to said plano reference surface;

means for recombining said second pair of spatially separated orthogonally polarized beams into a single beam with two orthogonal polarizations;

means for producing an interference pattern between said beams reflected from said plano reference and test surfaces, said reference pattern having radiant energy;

means for varying said relative phase of said orthogonal polarization components to modulate said interference pattern;

means disposed for imaging said test surface onto means for photosensing said radiant energy of said interference pattern over a two dimensional array of points over a period of time equal to that for at least one rotation of said rotating means for producing an electrical output; and means for calculating said distance between said plano reference surface and said test surface over said two dimensional array of points in accordance with said electrical outputs, said calculating means comprising means for calculating a first set of phases over said two dimensional array of points, said system further comprising means for varying the rotating rate of said rotating means by a known amount for providng a different rotation rate for said rotating means for obtaining a second set of phases over said two dimensional array of points, said calculating means calculating said distance between said reference surface and said test surface over said two dimensional array of points from said first and second set of phases such that said calculated separation is independent of phase shifts on reflection at said test surface.

8. A system in accordance with claim 7 wherein said calculating means further comprises means for calculating a minimum distance, a location of said minimum distance, a pitch and roll, crown, camber, and topography of said test surface while said test surface is flying.

9. An optical interferometer system capable of measuring the distance between a test surface and a plano reference surface which are in close proximity to each other comprising:

a source of beam of coherent, single wavelength, linearly polarized energy, said beam having a diameter and orthogonal polarization components having a relative phase;

means for spatially filtering and expanding said beam diameter;

means for producing a first pair of spatially separated beams with orthogonal polarizations from said spatially filtered beam;

rotating means comprising said plano reference surface and disposed for enabling said first pair of spatially separated beams to be incident thereon for producing a second pair of orthogonally polarized spatially separated beams, one of which is reflected from said plano reference surface of said rotating means the second of which is reflected from said test surface which is in close proximity to said plano reference surface;

means for recombining said second pair of spatially separated orthogonally polarized beams into a single beam with two orthogonal polarizations;

means for producing an interference pattern between said beams reflected from said plano reference and test surfaces, said reference pattern having radiant energy;

means for varying said relative phase of said orthogonal polarization components to modulate said interference pattern;

means disposed for imaging said test surface onto means for photosensing said radiant energy of said interference pattern over a two dimensional array of points over a period of time equal to that for at least one rotation of said rotating means for producing an electrical output; and means for calculating said distance between said plano reference surface and said test surface over said two dimensional array of points in accordance with said electrical outputs, said rotating means comprising a rotating glass disk substantially oriented at Brewster's angle to said separated beams for producing said second pair of orthogonally polarized separated beams, said calculating means comprising means for calculating a first set of phases over said two dimensional array of points and further comprising means for calculating said distance while said test surface is flying, said system further comprising means for varying the rotating rate of said glass disk by a known amount for providing a different rotation rate for said glass disk for obtaining a second set of phases over said two dimensional array of points, said calculating means calculating said distance between said reference surface and said test surface over said two dimensional array of points from said first and second set of phases such that said calculated separation is independent of phase shifts on reflection at said test surface.

10. A system in accordance with claim 9 wherein said distance calculated by said calculating means comprises means for calculating said distance in accordance with the expression $$h(x,y)=(\Phi(x,y)-\Phi_0(x,y))\lambda/(4\pi(1-\alpha)\cos\theta_B)$$

wherein h is the distance from said rotating glass disk reference surface, $\alpha$ is the ratio of said different rotation rates of said rotating glass disk, $\Phi(x,y)$ is the phase at each point in the image of said test surface, $\Phi_0(x,y)$ is the phase at each point in the image of said test surface at low flying heights, $\Phi(x,y)=2kh\cos\theta_B+\phi$, $\Phi_0(x,y)=2k\alpha h\cos\theta_B+\phi$, $k=2\pi/\lambda$, $\lambda$ is the wavelength of said source beam, and $\phi$ is the phase shift on reflection from said test surface.

11. A system in accordance with claim 10 wherein said light source comprises a laser.

12. A system in accordance with claim 11 wherein said photosensing means comprises means for integrating the intensity of said test surface image at each of said two dimensional array of points.

13. A system in accordance with claim 12 wherein said photosensing means has an associated frame rate, said calculating means comprising means for synchronizing said frame rate of said photosensing means such that said photosensing means integrates said intensity over one revolution of said glass disk.

14. A system in accordance with claim 13 wherein said means for varying said relative phase of said orthogonal polarization components of said beam comprises means for shifting said relative phase by $\pi/2$ after a frame of integrated intensity is sent from said photosensing means to said calculating means.

15. A system in accordance with claim 14 wherein said calculating means further comprises means for controlling said phase shifting means for shifting said relative phase by said $\pi/2$ after said frame of integrated intensity is sent from said photosensing means to said calculating means.

16. A system in accordance with claim 15 wherein said calculating means further comprises means for collecting said integrated intensity for at least four frames of said photosensing means.

* * * * *